Aug. 17, 1937.                E. H. JÄHNE ET AL                  2,090,448
          METHOD AND APPARATUS FOR CLOSING THE PROJECTING
                 ENDS OF WRAPPING SLEEVES FOR CIGARS
                      Filed Aug. 25, 1936           7 Sheets-Sheet 1

Inventors
E. H. Jähne
O. B. Ulke
By
E. F. Wenderoth
Atty

Inventors
E. H. Jähne
O. B. Ulke
By C. F. Wenderoth
Atty

Patented Aug. 17, 1937

2,090,448

UNITED STATES PATENT OFFICE 2,090,448

METHOD AND APPARATUS FOR CLOSING THE PROJECTING ENDS OF WRAPPING SLEEVES FOR CIGARS

Ernst Hermann Jähne and Otto Bernhard Ulke, Dresden, Germany, assignors to "Universelle" Cigarettenmaschinen-Fabrik J. C. Müller & Co., Dresden, Germany Application August 25, 1936, Serial No. 97,852
In Germany August 29, 1935

20 Claims. (Cl. 93—6)

The present invention relates to a novel and improved method and apparatus for closing the ends of cigar wrappings.

As is well known, cigars are often wrapped in a sleeve which consists of "Glassine" or the like. On inserting the cigars in the tubular sleeves portions of the latter project at each end of the cigar. A number of methods and apparatus are known for closing these projecting ends.

In general, according to the prior art, the projecting ends are closed by folding in such manner that the resultant folds extend longitudinally of the sleeves. The folds are then compressed, and finally the folded and compressed sleeve ends are either folded again transversely thereof or they are bent over in order that they may be attached, by cementing or the like, to the portion of the sleeve about the body of the cigar. As a rule, the initial folding is such that bellows-like creases result.

In closing the ends of the tubular sleeve, the object is to produce a fold which offers a maximum resistance to the constant tendency of the "Glassine" paper or the like to return to its original form. Moreover, the fold must be made so as to provide a completely airtight closure.

The folds hitherto provided do not, according to experience, completely fulfill these requirements, as the bellows-like fold of the "Glassine" paper tends again to expand and open the folds.

These defects are obviated by the present invention, according to which the projecting ends, while initially folded longitudinally, are folded in such manner as to produce a Z-shaped fold, rather than the undesirable bellows-like type of fold. According to the present invention, a completely tight closure is produced when the Z-shaped folds are compressed on each other.

Use is preferably made of an apparatus which is provided with two opposite parallel bending (or folding) bars, which are inserted in the ends of the tubular sleeve projecting from the cigar, and with two relatively staggered and movable bending fingers which swing in from the side and from the exterior between the parallel bending bars and thereby impart the Z-shape to the projecting sleeve end.

It is advantageous to mount the bending bars as well as the oscillatable bending fingers so that they may move transversely to their planes, so that after formation of the Z-shaped fold of the sleeve end, the bending bars and bending fingers can come together in order to compress and flatten the Z folds, relatively movable pressing jaws being provided which engage the superposed folds before the return of the bending bars and bending fingers and completely compress them.

The invention is explained in detail with reference to the other figures of the drawings which illustrate an exemplary embodiment of the new apparatus.

Figures 1, 1A:
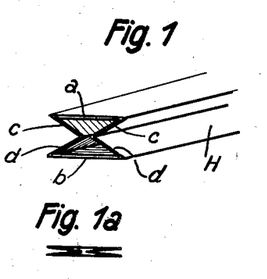
Fig. 1 is a perspective view of a method of folding a cigar wrapper end to form a bellows-like fold.
Fig. 1a is an end view of the fold of Fig. 1 in compressed form.

Referring first to Fig. 1 of the drawings, this shows a type of folding of a cigar wrapper end, whereby the undesirable bellows-like creases result. The wrapper or sleeve H, which encompasses the cigar, is folded by suitable folding means so as to form the surfaces $a$ and $b$ above and below, these being connected together by lateral obliquely-extending surfaces $c$ and $d$. The folds thus produced are compressed, as shown by the elevation of Fig. 1a, so that the sleeve end projecting from the cigar appears as a flattened strip. As hereinbefore pointed out, a fold of this character has a marked tendency to unfold and open.

Figures 2, 2A:
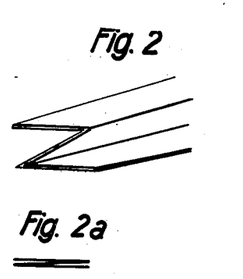
Fig. 2 is a perspective view of a cigar wrapper end folded into Z-form, according to the present invention.
Fig. 2a is an end view of the fold of Fig. 2 in compressed form.

This difficulty is overcome by folding the projecting wrapper ends, according to this invention, in such manner that a Z-shaped fold results; see Fig. 2. When compressed to flattened strip form, this fold will appear in cross section as shown in Fig. 2a.

Figure 10:
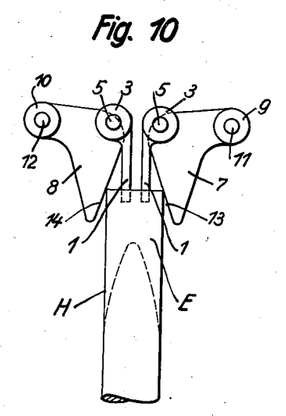
Figs. 10, 10a, 11, 11a, 12 and 12a are showings of details.
Figure 10A:
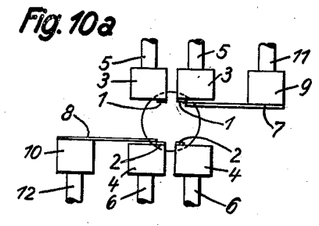

In practicing the present invention, the individual cigars are carried by the holders 19 which are attached in pairs, at uniform intervals, on two parallel conveyor chains 20. The two conveyor chains are carried over two pairs of guide wheels 21 which are disposed at the two ends of the apparatus and one of which is intermittently driven in conventional manner, so that the conveyor chains are advanced to the extent of one subdivision in the direction of the arrow shown on Fig. 3. Before the cigars Z are placed in the holders 19, they are encompassed with the sleeve-like "Glassine" paper casing. It is immaterial in this connection, whether the sleeve H is formed into a casing from a rectangular piece about the cigars or whether, like in cigarette wrappers, a tubular structure is produced from which suitable pieces are severed and provided with the cigars. As soon as the sleeve, provided with the cigar, has been carried by means of the conveyor chains to the point designated by e, the Z-shaped folding of the two sleeve ends begins. The manner in which this is done is first explained with reference to Figs. 10, 10a, 11, and 11a; Figs. 10a and 11a being views at right angles to Figs. 10 and 11. The folding in at one sleeve end is first described; the folding in of the other sleeve end takes place simultaneously in the same manner.

Two superposed bar pairs 1 and 2, which together form a bending or folding bar, are carried by the blocks 3 and 4, which form the ends of longitudinally slidably journalled supporting shafts 5 and 6. These supports are also movable in the longitudinal direction of the bars 1 and 2. The supports 5 and 6 move simultaneously from the position shown on Figs. 3 and 4 to the center of the ends E. Thereupon the folding bars formed by the bars 1 and 2 pass into the open end E of the sleeve H encompassing the cigar (see Fig. 10).

In addition, the folding fingers 7 and 8 are attached to the blocks 9 and 10 which form the ends of longitudinally and transversely movable shafts 11 and 12. The horizontally positioned folding fingers 7 and 8, constructed as flat bars, are provided at their ends directed toward the sleeve H with the oblique creasing edges 13 and 14. The folding fingers are relatively staggered with respect to the folding bars 1 and 2 (see particularly Fig. 10a); they are opposite each other, and in such manner that they can penetrate into the space between the folding bars 1 and 2 on corresponding movement of their supports.

This takes place as soon as the folding bars 1 and 2 are inserted in the projecting end E of the tubular sleeve H. The folding bars then pass from the position of Fig. 10 into that of Fig. 11. The resultant movement of the folding fingers causes the end E to be converted into a Z-shape, so that, at that point the material of the tube end is superposed in double wall formation (see Fig. 11a).

Figure 11:
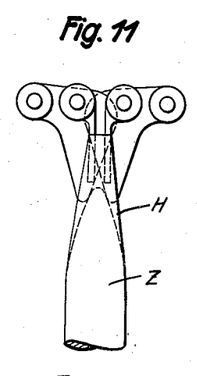
Figure 11A:
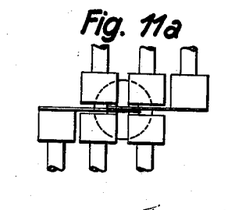

As a result of the oblique members 13 and 14, as shown by Fig. 11, the profile of the folded tube end conforms with that of the end of the cigar Z, as the inward folding is made smaller by the folding fingers 7 and 8.

Figure 12:
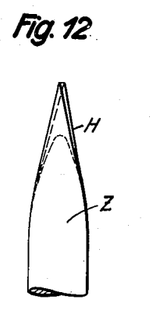
Figure 12A:
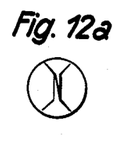

When the folding has progressed thus far and the structure shown on Fig. 2a is produced, then all the bending and folding fingers have moved relatively and assume a position like that shown on Fig. 11; the folded surfaces now lie smoothly on each other and a structure is produced as shown on Figs. 12, 12a.

The folding means described is controlled in the following manner.

Figure 3:
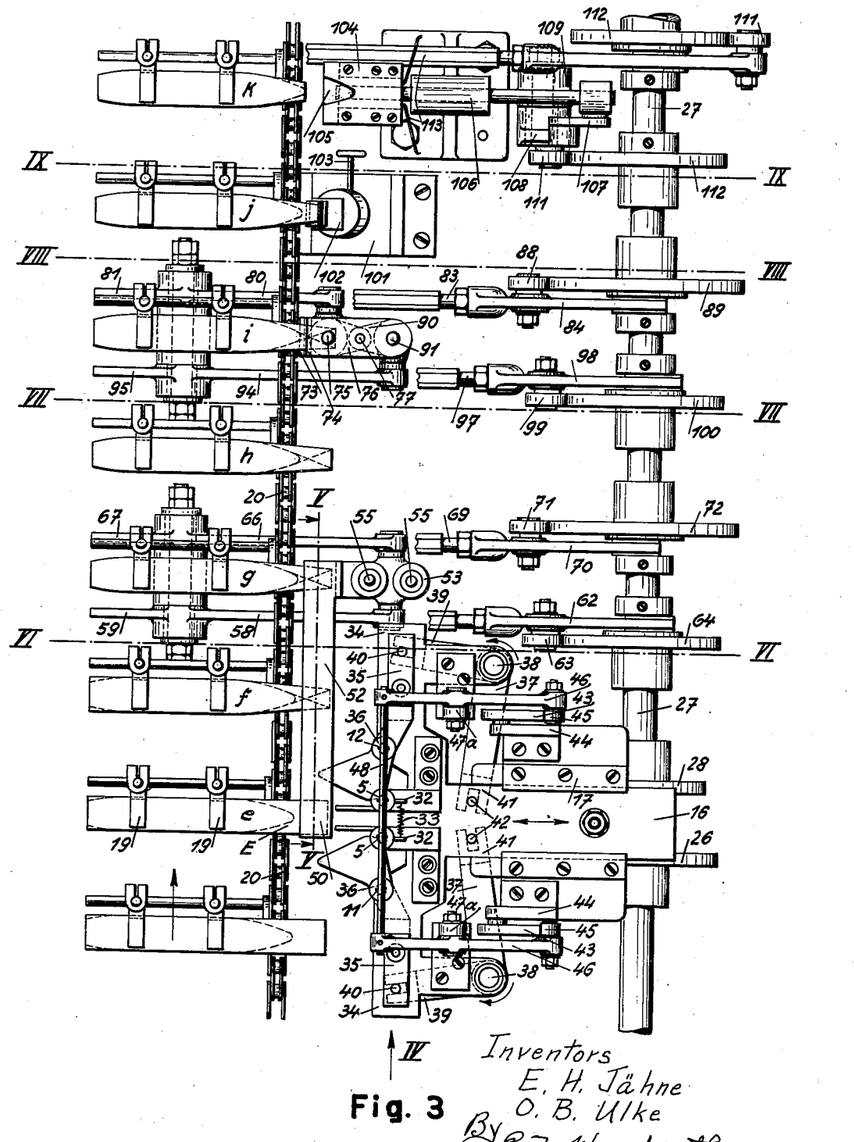
Fig. 3 is a top plan view of an apparatus according to the present invention.
Figure 4:
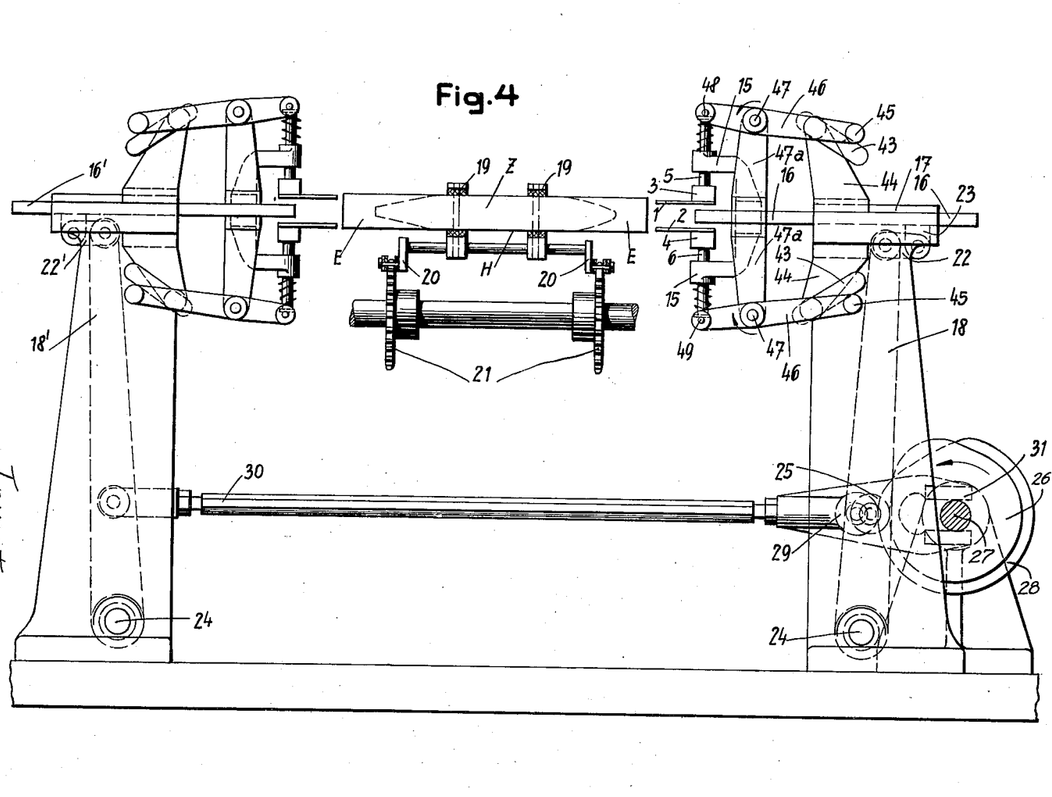
Fig. 4 is a side elevation of the apparatus of Fig. 3 viewed in the direction of arrow IV (Fig. 3)

As shown in Figs. 3 and 4, the spindles 5 and 6 are journalled for rotation and longitudinal movement in bearing blocks 15. The bearing blocks 15 are attached above and below to a slide member 16. The slide 16 is movable longitudinally in the direction of the double arrow, being retained in the guides 17. The reciprocal movement of slide 16 is effected through the medium of an oscillating lever 18, the upper end of which is connected, by the link 22 on a downwardly extending lug 23, with the slide. Journalled on the lever 18, which is pivoted at 24 on the frame of the apparatus, is the roller 25 which engages cam 26; the latter is mounted on the main drive shaft 27, adjacent to another cam 28 which cooperates with the roller 29. The roller 29 is mounted on a rod 30 which is pivoted, on the one hand, to lever 18', and on the other hand, encompasses shaft 27 with its forked end 31. The two cams 26 and 28 are relatively arranged and configured so that the two levers 18 and 18' are given a simultaneous movement in opposite direction. Thereupon lever 18', by means of a link member 22', engages with another slide 16' which, as shown on Fig. 4, carries the same control means as slide 16. Since slide 16' is provided with the same means and as its functions are the same as those of slide 16, only the right part of the apparatus, as shown on Fig. 4, is described hereinafter. The same applies also for the parts of the apparatus shown particularly on Fig. 3 which are also provided on the opposite side and which serve for closing the opposite sleeve end.

The shafts 5 and 6 are provided with radially directed pins 32, to the ends of which a traction spring 33 is attached. This spring 33 tends to rotate the shafts 5 or 6 so that the bars 1 and 2 are swung outwardly. The shafts 5 and 6 are, however, prevented from this movement by projections provided on the small bearing blocks 15, so that the spring retains the bars 1 and 2 in the position shown on Fig. 3. The function of the spring is merely to yield somewhat, if necessary, to a tendency to move the bars 1, 1 and/or 2, 2 with respect to each other.

Provided on each lateral extension 34 of slide 16 is a small guide block 35 which is moved horizontally but at right angles to the direction in which slide 16 moves. These guide blocks 35 are controlled by the angle levers 37 which are oscillatably journalled to the slide 16 by means of the pivot pins 38 attached to the extensions 34. The forked end 39 of each of these angle levers 37 engages one of the pins 40 provided on the guide blocks.

On the other hand, the free forked ends 41 of the angle levers 37 each engage a pin 42, these pins being attached to the frame of the apparatus. If thus the slide 16 is moved to the left, relative to Fig. 3, the angle levers are oscillated in the direction of the arrows. The two small guide blocks 35 are thereupon moved towards each other and the folding fingers 7 and 8 describe the movement explained with respect to Figs. 10 and 11. It is to be noted, in this regard, that the shafts 11 and 12 are retained axially slidably but non-rotatably in the bearing eyes 36 of the bearing blocks 35.

The vertical movement which the bending fingers 1, 2 and 7, 8 describe with respect to each other is derived from four cam members 43 which are adjustably attached to extensions 44 of the machine frame. Cooperating with these cam members are the rollers 45 which are provided on the double-arm levers 46. These levers 46 are rotatably journalled by means of the pivot pins 47 on the slide extensions 47a. The two free ends of the levers 46 disposed above the slide 16 are connected together by a cross bar 48, while the levers 46 disposed below the slide 16 are connected by a corresponding rod 49. This rod 48 is so arranged as to lie over the axes or shafts, 5, 5 and 11 preferably provided with a head-like enlargement. Coiled about these shafts are pressure springs which tend to hold them in the position shown on Fig. 4. The same is the case relative to rod 49. The latter is applied from below against the shafts 6, 6 and 12, forced downwardly by corresponding pressure springs. On movement of slide 16 to the left, with respect to Fig. 4, the levers are oscillated in the direction of the arrows shown on Fig. 4. Thereupon, the rods 48, 49, press from above and below on the head-like enlargements of the shafts 5, 5, 11 and 6, 6, 12, whereby the folding mechanism is shifted as shown particularly on Fig. 11a.

A set of pressing jaws 50, 51 is provided for each end E of the sleeve in the position e, the function of these pressing jaws being to come together while the folding members are still in the position shown on Fig. 11a. These pressing jaws 50, 51 are carried by the extending arms 52 which are attached to the two slides 53 and 54. The two slides comprise two vertical guide rods 55. Engaging with the upper slide 53 of the pressing jaw is the link member 56 which, on the other hand, is connected by the pivot pin 57 with the lever arm 58, 59 of a three-armed lever 58—60 (see Figs. 5 and 6).

Engaging with lever arm 60 is the rod 61, the forked end 62 of which engages the drive shaft 27, and by means of a roller 63 journalled thereon is in engagement with the cam 64 mounted on the shaft 27. The lever arm 66, 67 of the three-armed lever 66—68 engages by means of the link member 65 with the lower slide 54 which carries the pressing jaws 51. Engaging with the free lever arm 68 is a rod 69 which with its forked end 70 encompasses the drive shaft 27 and is engaged, by means of the roller 71 journalled thereon, with a cam disc 72 mounted on shaft 27. By means of the spring shown on the drawings the rod is actuated so that the rollers 63 and 71 are always held engaged with their respective cams. The cams are formed and relatively displaced in such manner that as soon as the slide 16 has reached the operative end position the two pressing jaws 50 and 51 are brought together by the cams 64, 72, so that the folding means and the material of the cigar casing are pressed together, whereupon the parts are in the position shown on Fig. 11a. The jaws are thereupon slightly moved apart by the cam members, whereupon the slides 16 are drawn back to their initial position. As soon as the folding means has been withdrawn from the ends of the sleeve, the pressing jaws 50, 51 are again brought together, so that only the Z-shaped sleeve material is pressed together.

The pressing jaws are then again moved apart so that the sleeve ends are entirely free. The conveyor chains 20 then advance to the extent of one step in the direction of the arrow shown on Fig. 3, so that the next sleeve provided with the cigar comes into the position e, whereupon the operation is repeated. After termination thereof the conveyor chain advances a step farther, whereby another sleeve provided with a cigar moves to the operative position designated e. During this advance movement the sleeve, folded together at the ends as above described, is carried successively to the positions designated f, g, h, etc.

Figure 7:
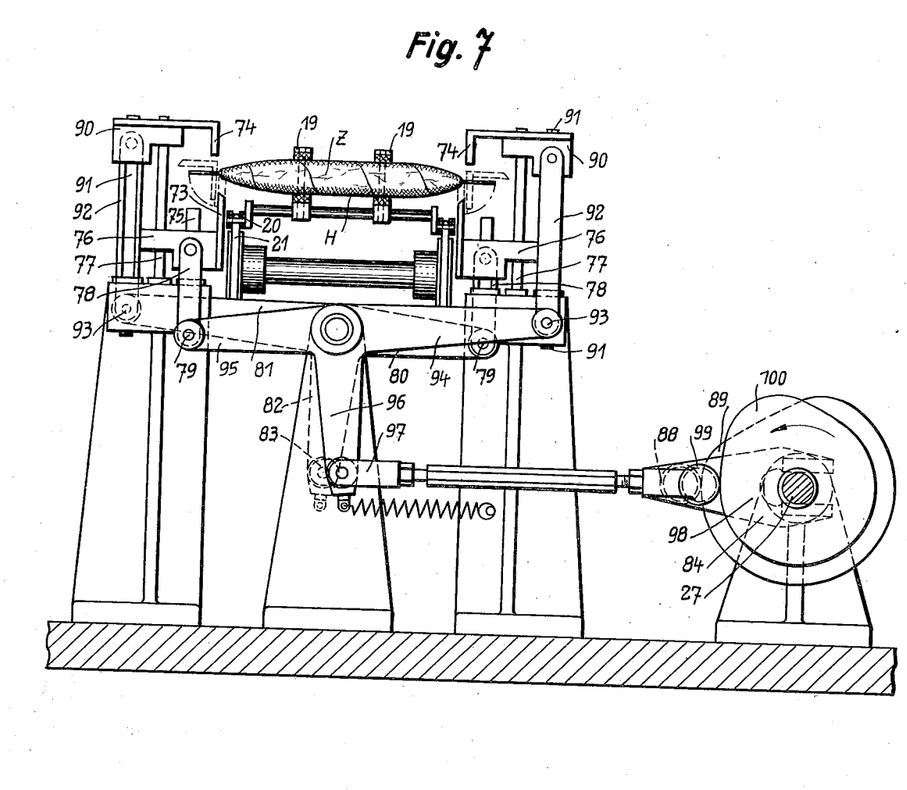

At the position designed i, the folded ends of the sleeve H are coordinated with a set of bearing fingers 74 and 73 (see also Fig. 7). The fingers 73 disposed below the cigar end are each attached to a slide 76 which comprises the two guide rods 75 and 77. Engaging with each slide 76 is a link member 78 which is connected at the other end by the pivot pin 79 with the end of a lever arm 80 or 95. The lever arms 80, 95 are mounted on the three-armed levers 80—82 and 94—96, lever arm 82 being in engagement with rod 83. The forked end 84 of the latter is connected to the main drive shaft 27, while its other end, provided with guide roller 86, bears on cam member 89. The upper folding finger 74 is attached to a slide 90 which engages on the one hand a guide rod 91 and on the other hand, the guide rod 77. Engaging on each slide 90 is a link member 92, these link members being connected by the pivot pins 93 with the lever arms 81 or 94 of the three-armed levers 80—82 and 94—96. Engaging with the lever arm 96 of the three-armed levers 94—96 is the rod 97, the free forked end 98 of which encompasses the shaft 27. The guide roller 99 provided on the rod 97 is engaged with the cam 100 mounted on shaft 27. As soon as the cigar casing H passes into the range of the folding fingers 73, 74, they are moved toward each other, as shown on Fig. 7 (dotted position). The finger 73 thereupon serves as a counter-support while the finger 74 turns the folded end rectangularly downward.

It is to be noted that the rods 83 and 97 also are actuated by springs so that their guide rollers 88 and 99 are drawn toward their respective cams.

Figures 5, 8, 8A:
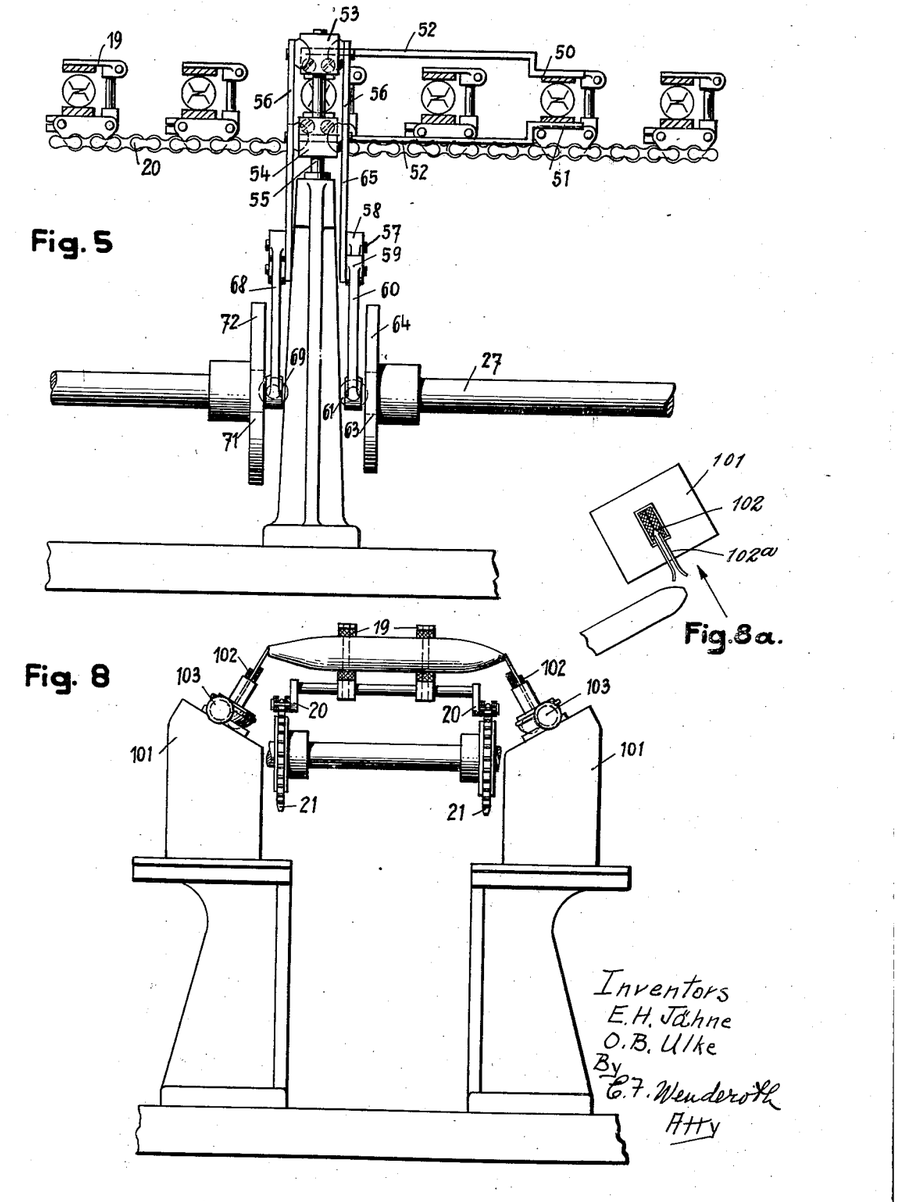
Fig. 5 is a side elevation viewed from the left with reference to Fig. 6.
Figs. 6 to 9 are vertical cross sections along the corresponding lines VI—VI, VII—VII, VIII—VIII, and IX—IX of Fig. 3.
Fig. 8a is a detail showing of the adhesive-applying means.
Figure 6:
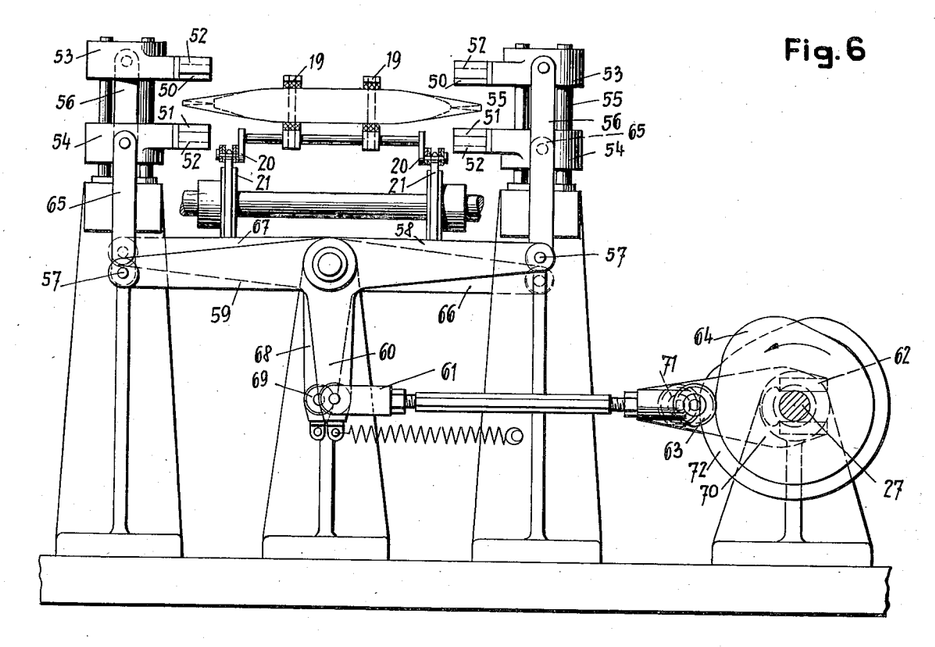

As shown particularly on Fig. 3, the adhesive receptacles 101 are coordinated with the path of the conveyor chains 20. Each of these adhesive receptacles is provided, as shown on Fig. 8, with two parallel wick nozzles from which the adhesive wicks 102 extend. By means of regulating or adjusting devices 103, the wicks can be so adjusted that when the sleeve provided with the cigar passes from the position i to the position j the two sleeve ends which are folded together are bent down at right angles and passed between the wick ends saturated with adhesive, being guided thereto by means of guide members 102a (Fig. 8a). Thereby the sleeve ends, which are folded together into several layers, take up the adhesive to such extent that when the sleeve passes from the position j to the position k these sleeve ends are abundantly provided with adhesive.

The operative position designated by k is coordinated with folding slides 104, the ends 105 of which are hollowed out to conform to the shape of the cigar. These slides are retained so as to be horizontally movable in guides 106. Engaging with the slides 104, by means of the link members 107, are the oscillating levers 108, which are journalled at 109 in the frame of the apparatus. By means of a traction spring 110 engaging with the lever 108 at the right of Fig. 9, the roller 111 journalled on the said lever is drawn against a cam 112 which is mounted on shaft 27.

Figure 9:
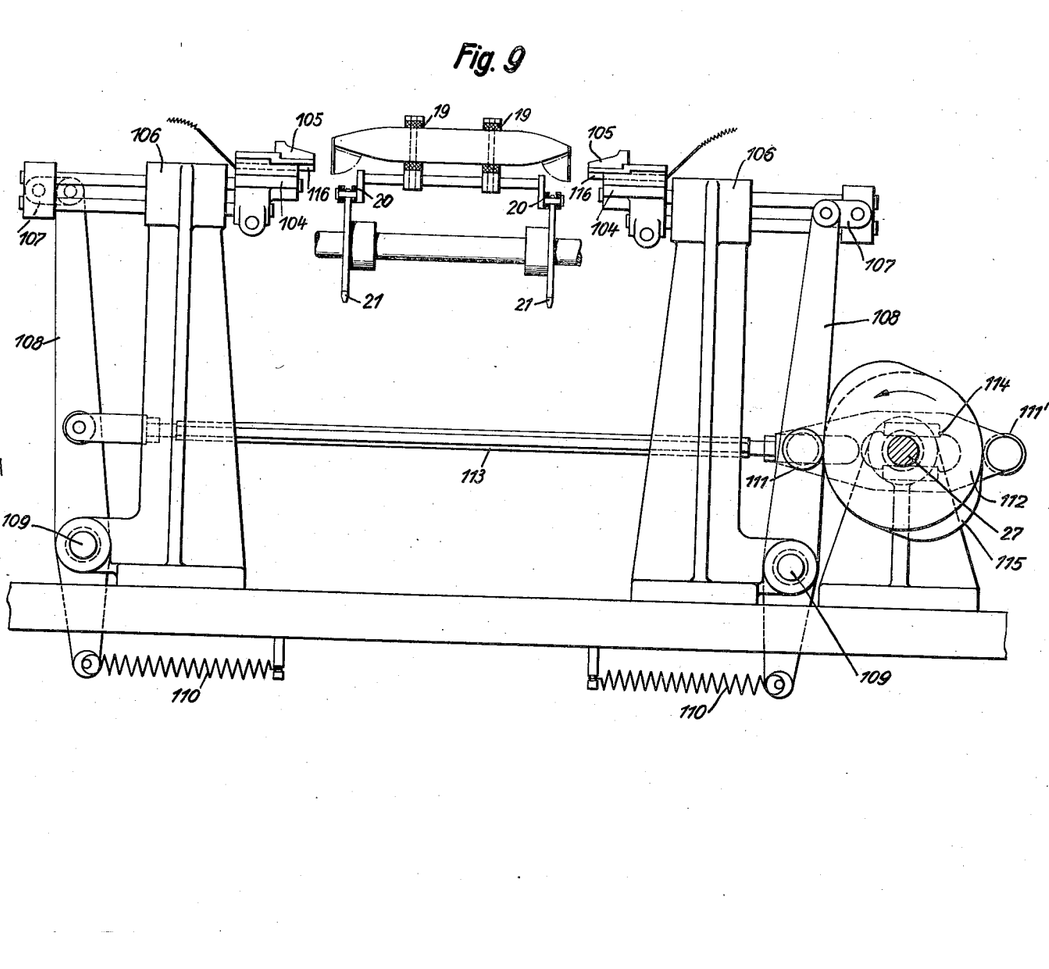

Lever 108 at the left of Fig. 9 is engaged by a rod 113 which engages shaft 27 by a slide guide 114. A roller 111' journalled on rod 113 is drawn by the corresponding spring 110 against the cam disc 115 mounted on shaft 27.

These folding slides 104 are also preferably provided with an electric heating plate 116 which heats the folding slides to a certain degree, so that simultaneously with the folding of the previously depending sleeve ends into the dotted position of Fig. 9, rapid setting of the adhesive is assured.

After the cigar sleeve has been closed in this manner, it is delivered during the course of further conveyor steps into the packing machine in which the cigars pass into boxes or similar packing means.

Having described the invention, what is claimed is:

1. In a method of closing the projecting ends of tubular wrapping sleeves for cigars, the step of longitudinally folding each end into Z-shaped transverse configuration.

2. Method of closing the projecting ends of tubular wrapping sleeves for cigars, comprising first longitudinally folding each end in such manner as to form a Z-shaped fold therein, then flattening each folded sleeve end by subjecting it to compression, then folding each flattened end over transversely thereof, and finally securing each folded over portion to the body of the sleeve.

3. Apparatus for closing the projecting ends of tubular wrapping sleeves for cigars, comprising two oppositely positioned parallel folding bars adapted to be inserted into one of said ends, means for inserting said bars into and withdrawing them from said end, and two relatively staggered and movable folding fingers mounted for oscillatory movement into lateral engagement with said sleeve end intermediate said parallel folding bars, whereby a Z-shaped configuration is imparted to the sleeve end.

4. Apparatus for closing the projecting ends of tubular wrapping sleeves for cigars, comprising means for longitudinally folding each end into Z-shaped cross-sectional configuration, means for compressing each folded end into flattened form, means for folding each flattened end over transversely thereof, and means for adhesively securing each folded-over end to the body of the sleeve.

5. Apparatus as defined in claim 4, said first named means comprising a plurality of folding bars insertible into each projecting end and a pair of relatively displaced folding fingers movable laterally into engagement with each sleeve end on opposite sides thereof.

6. Apparatus as defined in claim 3, said folding bars and folding fingers being mounted for movement perpendicularly of the planes thereof, means for moving said bars and fingers toward each other after formation of Z-shaped fold of the sleeve end, whereby the latter is initially flattened, and means for finally compressing the sleeve end into flattened form.

7. Apparatus as defined in claim 3, said folding bars and folding fingers being mounted for movement perpendicularly of the planes thereof, means for moving said bars and fingers toward each other after formation of Z-shaped fold of the sleeve end, whereby the latter is initially flattened, relatively movable pressing jaws adapted to receive said end to finally compress the same into flattened form, and means for actuating said pressing jaws.

8. Apparatus as defined in claim 3, the opposed edges of said folding fingers extending obliquely with respect to the longitudinal axis of the wrapping sleeve, whereby the portions of said fingers which contact the outer portions of the sleeve end overlap each other upon completion of the folding operation.

9. Apparatus for closing the projecting end of a tubular wrapping sleeve for cigars, comprising two oppositely positioned parallel folding bars adapted to be inserted into said end, two relatively displaced folding fingers oscillatable into lateral engagement with said sleeve end intermediate said parallel folding bars, a slidable support upon which said bars and fingers are mounted, said support being slidable axially with respect to said sleeve, and cam means coacting with said slidable support for actuation thereof.

10. Apparatus as defined in claim 9, and means associated with said slidable support for imparting oscillatory movement to said fingers as said support is actuated.

11. Apparatus for closing the projecting end of a tubular wrapping sleeve for cigars, comprising means for longitudinally folding said end into Z-shaped cross-sectional configuration, means for compressing the folded end into flattened form, means for transversely bending down the folded and flattened sleeve end rectangularly to the longitudinal direction of the sleeve, said last-named means comprising a pair of movable bending members disposed respectively above and below said sleeve end, and means for adhesively securing the bent-over end to the body of the sleeve.

12. Apparatus as defined in claim 11, means for moving one of said bending members into close juxtaposition with said sleeve end whereby it constitutes a support for the latter, and means for actuating the other bending member to bend said end over said support.

13. Apparatus for closing the projecting ends of tubular wrapping sleeves for cigars, comprising means for longitudinally folding each end into Z-shaped cross-sectional configuration, means for compressing each folded end into flattened form, means for folding each flattened end over transversely thereof, and means for adhesively securing each folded-over end to the body of the sleeve, said last-named means comprising an adhesive-applying device mounted for relative movement with reference to said sleeve ends.

14. Apparatus for closing the projecting ends of tubular wrapping sleeves for cigars, comprising means for longitudinally folding each end into Z-shaped cross-sectional configuration, means for compressing each folded end into flattened form, means for folding each flattened end over transversely thereof, and means for adhesively securing each folded-over end to the body of the sleeve, said last-named means comprising an adhesive-applying device mounted for relative movement with reference to said sleeve ends, said adhesive-applying device comprising two parallel projecting adhesive-applying wicks between which the sleeve ends are drawn.

15. Apparatus for closing the projecting ends of tubular wrapping sleeves for cigars, comprising means for longitudinally folding each end into Z-shaped cross-sectional configuration, means for compressing each folded end into flattened form, means for folding each flattened end over transversely thereof, and means for adhesively securing each folded-over end to the body of the sleeve, said last-named means comprising a device for applying adhesive to said ends and an applicator member for applying the adhesive-coated ends to the body of the sleeve.

16. Apparatus for closing the projecting ends of tubular wrapping sleeves for cigars, comprising means for longitudinally folding each end into Z-shaped cross-sectional configuration, means for compressing each folded end into flattened form, means for folding each flattened end over transversely thereof, and means for adhesively securing each folded-over end to the body of the sleeve, said last-named means comprising a device for applying adhesive to said ends and an applicator member for applying the adhesive-coated ends to the body of the sleeve, said applicator being shaped to correspond to the form of the cigar ends, whereby it is adapted to retain the adhesive-coated ends in close contact with the body of the sleeve until the adhesive has set.

17. Apparatus for closing the projecting ends of tubular wrapping sleeves for cigars, comprising means for longitudinally folding each end into Z-shaped cross-sectional configuration, means for compressing each folded end into flattened form, means for folding each flattened end over transversely thereof, and means for adhesively securing each folded-over end to the body of the sleeve, said last-named means comprising a device for applying adhesive to said ends and an applicator member for applying the adhesive-coated ends to the body of the sleeve, said applicator comprising a slide member movable axially with respect to the sleeve, said slide member being provided at its engaging end with a hollow portion corresponding to the form of the cigar end.

18. Apparatus for closing the projecting ends of tubular wrapping sleeves for cigars, comprising means for longitudinally folding each end into Z-shaped cross-sectional configuration, means for compressing each folded end into flattened form, means for folding each flattened end over transversely thereof, and means for adhesively securing each folded-over end to the body of the sleeve, said last-named means comprising a device for applying adhesive to said ends and an applicator member for applying the adhesive-coated ends to the body of the sleeve, said applicator being shaped to correspond to the form of the cigar ends, and means for heating said applicator, whereby it is adapted to retain the adhesive-coated ends in close contact with the body of the sleeve until the adhesive has set.

19. Apparatus for closing the projecting ends of tubular wrapping sleeves for cigars comprising a plurality of substantially uniformly spaced devices for successively folding said ends into Z-shape section, compressing the folded ends, transversely bending the compressed ends, applying adhesive to the latter, and applying the adhesive-coated ends to the body of the sleeve; and intermittently-actuated conveyor means for successively moving the sleeves and cigars from one device to the next.

20. Apparatus as defined in claim 19, a drive shaft common to all said devices and arranged substantially parallel to said conveyor means, and means for severally transmitting motion from said drive shaft to said devices.

ERNST HERMANN JÄHNE.
OTTO BERNHARD ULKE.